United States Patent
Joos et al.

(10) Patent No.: US 10,771,346 B2
(45) Date of Patent: Sep. 8, 2020

(54) METHOD FOR MONITORING A NETWORK FOR ANOMALIES

(71) Applicant: CONTI TEMIC MICROELECTRONIC GMBH, Nuremberg (DE)

(72) Inventors: Uli Joos, Nonnenhorn (DE); Florian Gerster, Uhldingen-Muehlhofen (DE); Lorenz Lieder, Biberach A.D. Riss (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/341,254

(22) PCT Filed: Mar. 22, 2017

(86) PCT No.: PCT/EP2017/056807
§ 371 (c)(1),
(2) Date: Apr. 11, 2019

(87) PCT Pub. No.: WO2018/068900
PCT Pub. Date: Apr. 19, 2018

(65) Prior Publication Data
US 2020/0044937 A1    Feb. 6, 2020

(30) Foreign Application Priority Data

Oct. 11, 2016  (DE) .......................... 10 2016 219 663

(51) Int. Cl.
*H04L 12/24*  (2006.01)
*H04J 3/06*  (2006.01)

(52) U.S. Cl.
CPC .......... *H04L 41/142* (2013.01); *H04J 3/0641* (2013.01)

(58) Field of Classification Search
CPC ....... H04J 3/0635; H04J 3/0641; H04L 41/06; H04L 41/142
See application file for complete search history.

(56) References Cited

U.S. PATENT DOCUMENTS

| 5,384,541 A | 1/1995 | Chu et al. |
| 7,366,774 B2 | 4/2008 | Gibart et al. |
| (Continued) | | |

FOREIGN PATENT DOCUMENTS

| DE | 3033173 A1 | 3/1982 |
| DE | 19602810 A1 | 7/1997 |
| (Continued) | | |

OTHER PUBLICATIONS

Fergusson P, et al., "Network Ingress Filtering: Defeating Denial of Service Attacks which employ IP Source Address Spoofing", The Internet Society (2000), Network Working Group, BCB 38, IETF, pp. 1-10.

(Continued)

*Primary Examiner* — Khaled M Kassim
(74) *Attorney, Agent, or Firm* — Laurence A. Greenberg; Werner H. Stemer; Ralph E. Locher

(57) ABSTRACT

A method monitors a data transmission network having a plurality of devices connected to one another over fixedly prescribed signal transmission paths, for anomalies. One of the devices is a master device that has a counter and a trigger apparatus, by which a prescribed signal feature of a signal is acquired, and upon the acquisition, a master counter state corresponding thereto is read. The method provides for an evaluation apparatus to determine, under predetermined conditions, a setpoint value of at least one network-specific parameter defined by a physical property of the network, before an actual value of the network-specific parameter is determined from a difference between the master counter state and a further counter state, and an anomaly is indicated (Continued)

if a predetermined deviation criterion between the actual value and the setpoint value is met.

10 Claims, 2 Drawing Sheets

(56) References Cited

U.S. PATENT DOCUMENTS

| | | | |
|---|---|---|---|
| 8,369,966 | B2 | 2/2013 | Holzaepfel et al. |
| 8,848,767 | B2 | 9/2014 | Kashima et al. |
| 8,930,579 | B2 | 1/2015 | Pleasant et al. |
| 2004/0153534 | A1 | 8/2004 | Gibart et al. |
| 2005/0232384 | A1 | 10/2005 | Heid et al. |
| 2006/0206613 | A1 | 9/2006 | Narita |
| 2008/0049633 | A1 | 2/2008 | Edwards et al. |
| 2011/0228888 | A1* | 9/2011 | Gelter ............... H04N 21/4344 375/371 |
| 2013/0241746 | A1* | 9/2013 | McKinley ............ G01R 29/18 340/870.02 |
| 2014/0149805 | A1* | 5/2014 | Michihata ........... G06F 11/0751 714/48 |
| 2014/0340236 | A1* | 11/2014 | Rhoads ................ G01R 29/18 340/870.02 |
| 2015/0074267 | A1 | 3/2015 | Manning et al. |
| 2015/0236940 | A1 | 8/2015 | Zinner et al. |
| 2016/0198245 | A1* | 7/2016 | Rhoads ............ G01R 19/2513 340/870.02 |
| 2017/0374573 | A1* | 12/2017 | Kleinbeck ............ H04W 24/08 |
| 2018/0212849 | A1* | 7/2018 | Hobgood ........... H04L 61/1511 |

FOREIGN PATENT DOCUMENTS

| | | |
|---|---|---|
| DE | 102012216689 A1 | 5/2014 |
| DE | 102015206085 A1 | 10/2016 |
| EP | 1087530 A1 | 3/2001 |
| EP | 1696570 A2 | 8/2006 |
| KR | 20150061779 A | 6/2015 |
| WO | 2009092548 A1 | 7/2009 |

OTHER PUBLICATIONS

Seifert, Stefan et al., "Secure Automotive Gateway—Secure Communication for Future Cars", 2014 12th IEEE International Conference on Industrial Informatics, pp. 213-220.

* cited by examiner

METHOD FOR MONITORING A NETWORK FOR ANOMALIES

BACKGROUND OF THE INVENTION

Field of the Invention

The invention relates to a method according to the preamble of the independent method patent claim for monitoring a network, provided for data transmission, for anomalies.

Known methods for detecting anomalies in networks use comparisons of time patterns, for example. In this case, presence of an anomaly is derived from an observed deviation from an expected periodicity of signals transmitted via the network.

Other method approaches investigate for example data content of signals transmitted via the network in terms of a characteristic pattern of a signal source.

It is also known in principle to obtain propagation time difference patterns of signals transmitted via the network by way of or using the known Precision Time Protocol (PTP) in accordance with IEEE-1588 and to evaluate them to detect anomalies. In PTP, respective timestamps are automatically inserted into signals or messages transmitted via the network, which timestamps make it possible to determine a delay time and a time offset between a sending and a receiving station. However, this approach requires stations or transceivers that are appropriately equipped and suitable software-side evaluation. PTP is used primarily to meet stringent real-time requirements, for instance ensuring simultaneity at various stations in a network, primarily in an Ethernet network. The disadvantage here is however that all of the stations in the respective network have to actively transmit and receive timestamps.

SUMMARY OF THE INVENTION

The object of the present invention is to specify a method for monitoring a data transmission network for anomalies, which method is able to be applied with as little additional expenditure as possible and places as few requirements on the network as possible.

This object is achieved according to the invention by a method having the features of the independent patent claim. Advantageous refinements of the invention are specified in the dependent claims.

The method according to the invention serves to monitor a network provided for data transmission, consisting of a plurality of devices connected to one another over fixedly prescribed signal transmission paths, for anomalies. The network thus comprises both the devices and the signal transmission paths, or is constructed from the devices and the signal transmission paths. The signal transmission paths may for example be electrical lines, wherein the line sections over which a signal propagates are set or prescribed and in particular unchanging and constant. In other words, each signal sent by a particular device thus always covers the same path in the network. In the method, it is provided for one of the devices to be a master device that has a counter and a trigger apparatus, by which a prescribed signal feature of a signal transmitted via the network is acquired. The signal transmitted via the network may be a data transmission, a data packet or a data stream and may also be referred to as a message. Upon the acquisition of the signal feature, a master counter state, corresponding to a time of this acquisition, of the counter of the master device is read. A time of acquisition and/or reading or a counter state may also be referred to as acquisition time. Likewise, acquiring a counter state corresponding to this respective acquisition respectively also means that the counter state corresponds to the respective acquisition time. This may mean that the counter state is read at the same time as or immediately after the acquisition or the counter state is read at a predetermined set and constant time interval with respect to the time of the acquisition, which may be defined for example by a hardware-induced and/or electronics-induced latency.

To allow anomaly monitoring and/or anomaly detection with as little expenditure as possible and while placing as few requirements as possible on the network, it is provided, according to the invention, for an evaluation apparatus to determine, under predetermined anomaly-free conditions, a setpoint value of at least one network-specific parameter defined by a physical property or boundary condition of the network. A respective actual value of the at least one network-specific parameter is then determined by the evaluation apparatus from a difference between the read master counter state and a further counter state. An anomaly is finally indicated if and/or when a predetermined deviation criterion between the actual value and the setpoint value is met. The method in this case therefore makes it possible to secure a source of the signal or of the message in the network through the characteristic parameter or a characteristic pattern that is only given or defined by physical boundary conditions given in the network.

Advantageously, an anomaly is thus able to be detected without for example a periodicity of the investigated or evaluated messages or signal features being expected or being necessary. Furthermore, advantageously, no cooperation whatsoever of the signal source, that is to say of a device transmitting the message or the signal, is required either. This means that, advantageously, no additional information, such as for instance a timestamp, has to be sent by the sending device(s) or station(s). Since the minimum requirement is initially just that the master device has to be equipped or configured so as to perform the method, the method is advantageously able to be applied or used with little component, device and/or implementation expenditure both in networks to be newly installed and in existing networks. Additional or extra expenditure, necessary in addition to the basic data transmission function, is thus kept low, since, for typical networks, not all—often even a predominant majority—of the devices require any additional modification whatsoever to successfully apply the method. Since the used parameter is determined or set by the respective individual physical boundary conditions of the network, an attack on the network manipulation of the network and/or of the signals, messages or data transmitted via the network is not able to be performed without being noticed, or at least not without considerable expenditure. By way of example, is not possible to falsify, manipulate or adapt a signal such that the network-specific parameter and/or its presence would be simulated, or at least not without considerable expenditure.

According one embodiment of the method according to the invention, it is provided for a propagation time pattern of the signal in the network to constitute the at least one network-specific parameter. To determine its actual value, it is provided here for one of the devices of the network to be a client device that likewise has a counter and a trigger apparatus. In this case, the signal is transmitted via the network both to the master device and to the client device. Furthermore, the prescribed signal feature of the signal is acquired by the trigger apparatus of the client device and a client counter state, corresponding to a time of this acquisition, of the counter of the client device is read. The actual value of the propagation time pattern is then determined on the basis of the client counter state, which serves as the further counter state for determining an actual value of the network-specific parameter. The client counter state may for example be transmitted separately to the master device and/or to the evaluation apparatus. The master device and the client device are different devices, separate from one another, that are connected to a signal transmission path, that is to say incorporated into the network, at different points. This arrangement advantageously makes it possible to determine and/or to evaluate the propagation time pattern using relative signal propagation times and/or counter states, without a timestamp or an absolute time applicable for the entire network being necessary. The propagation time pattern comprises for example a particular relationship of a respective propagation time of the signal from the signal source to the master device and to the client device, and is determined by a propagation medium or transmission medium used for the signal transmission and a spatial distance or a spatial positional relationship between the signal source, the master device and the client device, in particular by a corresponding length of the respective signal transmission paths between the signal source, the master device and the client device. In this case, it is also possible to take into account delays or latencies that are caused by respective components used for signal reception and/or signal forwarding in the network. Although the client counter state is referred to as the further counter state here, further additional or other further counter states may by all means also be taken into account. Likewise, the propagation time pattern constitutes just one network-specific parameter here, and this should not exclude the fact that further network-specific parameters may be taken into account, determined and/or evaluated.

In a further refinement of the method according to the invention, it is provided for a reference signal to be transmitted from the client device to the master device by way of which or in which a read reference client counter state corresponding to a sending time of a prescribed signal feature of the reference signal is transmitted to the master device. The prescribed signal feature of the reference signal is acquired by the trigger apparatus of the master device and a reference master counter state, corresponding to a time of this acquisition of the prescribed signal feature of the reference signal, is read. The reference client counter state and the reference master counter state are then also used to determine the propagation time pattern. The prescribed signal feature of the reference signal may by all means be different from the prescribed signal feature of the signal transmitted to the master device and to the client device. Just one specific configuration or adjustment of two devices of the network, namely of the master device and of the client device, is advantageously necessary here. The other devices of the network, by contrast, do not have to meet any particular conditions or requirements whatsoever. The reference signal or a corresponding reference message may be transmitted or sent before or after the signal sent to the master device and to the client device, the reference signal preferably being sent within a prescribed time interval with respect to the signal. By way of example, a reference signal may be sent from the client device to the master device regularly, in particular at prescribed time intervals, the time intervals being able to be fixed and constant or variable, dynamic and/or tailored to the situation. Likewise, following the reception of the signal, the reference signal may be sent in response to the reception of the signal.

In a further refinement of this embodiment of the method according to the invention, it is provided for the actual value of the propagation time pattern Pat of the signal to be calculated as $$Pat=[C_{XM}-C_{XC}]-[C_{RM}-C_{RC}]=[C_{XM}-C_{RM}]-[C_{XC}-C_{RC}].$$

In this case, $C_{XM}$, gives the master counter state corresponding to the signal feature. $C_{XC}$, indicates the client counter state corresponding to the signal feature, $C_{RM}$ indicates the reference master counter state and $C_{RC}$ indicates the reference client counter state. Through this definition of the propagation time pattern or the calculation of the propagation time pattern, an initially unknown offset or time offset of the client device or of the counter of the client device in relation to the master device or the counter of the master device is advantageously able to be eliminated from the calculation or consideration.

The propagation time pattern may be determined independently of its specific calculation or definition for the signal and compared with a setpoint value obtained under controlled conditions, that is to say with a setpoint propagation time pattern. It is likewise possible, for several or all of the signals transmitted via the network, to determine the respective propagation time pattern and to evaluate for example a temporal development, an emerging change, an outlier or a deviation with respect to an average value or the like and/or to take these into account when checking for the presence of an anomaly. As a result, a temporal change or drift, possibly caused for example by ageing, in properties of the network that influence the propagation time pattern are able to be recognized and a corresponding false detection of an anomaly is able to be avoided.

In a further refinement of the method according to the invention, it is provided for the actual value of the propagation time pattern to additionally be determined by a client-side part of the evaluation apparatus that is configured so as to perform its own calculations. The anomaly or presence of the anomaly is then indicated if and/or when the deviation criterion between the respective determined actual value and the setpoint value is recognized as being met by the evaluation apparatus and/or by the client-side part of the evaluation apparatus. In other words, the evaluation apparatus may thus be arranged or structured in a distributed manner and also consist of several parts or partial apparatuses that may be separate from one another or connected to one another. If a client-side part is provided, then two independent calculations or determinations or establishments of the propagation time pattern are performed. This advantageously results in additional security or securing against malfunctions, attacks, manipulations or generally against anomalies. The client-side part of the evaluation apparatus may in particular be part of the client device, for which purpose for example a corresponding evaluation circuit and/or corresponding components may be arranged in the client device or integrated into the client device. Another part of the evaluation apparatus may be arranged therein for example as part of the master device or integrated therein or else be provided independently thereof as a separate apparatus or as a separate device. In the latter case, of course, data, signals, counter states or the like, required for respective data processing or data evaluation, each need to be transmitted to the evaluation apparatus. This may be performed via the network or a separate line or data connection may be provided for this purpose, these being able for example to serve solely for this purpose. It may also be possible, in a further step, to additionally compare the two propagation time patterns, determined independently of one another, with one another. If it turns out here that there is a deviation or difference between the propagation time patterns, it is then possible for example to draw a conclusion therefrom as to a location and/or a type of a cause, for example an anomaly.

In a further refinement of the method according to the invention, it is provided for a second prescribed signal feature of the signal to additionally be acquired by the trigger apparatus of the master device. A further master counter state, corresponding to a time of this acquisition of the second prescribed signal feature, is then read. A frequency difference between a frequency of a clock generator of an actual source device, from which the signal was transmitted, and a clock generator of the master device, coupled to the counter of the master device, in this case then forms the network-specific parameter. The actual value of this frequency difference is determined on the basis of a difference between the master counter state and the second counter state and taking into account a prescribed data transmission rate and/or network clock frequency used in the network and/or a communication protocol used in the network and/or a type of modulation used in the network. The frequency difference may be for instance a relative frequency deviation or a corresponding frequency ratio.

For the sake of clarification and better differentiation from the second master counter state, the master counter state is also referred to as first master counter state.

The two prescribed signal features may be or indicate for example a start and an end of the signal. One or both of the prescribed signal features may however also be situated or arranged so as to be temporally spaced from the beginning and/or the end within the signal. The relative frequency deviation and the corresponding frequency ratio constitute characteristic variables for a particular configuration of the network or a particular selection of concrete, specific individual devices. Individual properties of the respective devices are thus taken into account here, such that a manipulation or an attack is advantageously able to be recognized without for example content analysis of data content transmitted by way of or in the signal being necessary. This process may additionally be designed so as to be difficult, for example in the case of an encryption. It is likewise optionally made possible to intercept a correspondingly manipulated signal or a signal originating from an external source, before for example program code contained therein or instructions for a logic circuit contained therein are able to lead to undesired effects.

In a further refinement of the invention, it is provided for the relative frequency deviation to be calculated as $$\Delta f_{rel} = \Delta C_X / \Delta C_{XMM}.$$

$\Delta C_X$ in this case indicates a number of cycles awaited or used by the actual source device between the transmission of the prescribed signal features and $\Delta C_{XMM}$ indicates the difference between the first master counter state and the second master counter state.

In a further refinement of the method according to the invention, it is provided for an anomaly in the network to be recognized if the actual source device simulates being another purported source device of the network. In a check as to whether the deviation criterion is met, the evaluation apparatus takes into account a temperature, acquired by way of a respective temperature sensor, of the master device and of the purported source device from which the signal was purportedly or allegedly transmitted. At least two temperatures are thus taken into account, namely the temperature of the master device and the temperature of the purported source device. The purported source device may be identified in the signal, for example, as is conventional for example in known bus-based networks. Taking these temperatures into account is particularly advantageous, since a temperature change may also lead to a frequency or clock frequency change, and a false detection of an anomaly and/or a corresponding false alarm are thus able to be avoided. The respective temperatures may change for example due to normal operating procedures during the operation of the network. The relative frequency deviation and the corresponding frequency ratio are distributed statistically at a given temperature and constant for a given pair of two devices at a given temperature. An individual temperature behavior, that is to say an individual change in the frequency or clock frequency of a device at or in the case of a changing temperature, may possibly advantageously also be determined in advance and taken into account in the check of the deviation criterion. The respective temperature sensors may be arranged or incorporated or installed easily and inexpensively on or in the individual devices of the network, including subsequently. The temperature sensors may be coupled or connected directly or indirectly to the evaluation apparatus in order to transmit the respective temperatures or temperature values or temperature data to said evaluation apparatus. This may be performed via one or more separate lines or data connections. It may however also be possible to transmit the temperature data via the network itself. To this end, the temperature sensors may for example be incorporated directly into the network or use respective sending apparatuses of the respective monitored devices. In the case of provision of air conditioning or temperature adjustment and/or an arrangement of several devices of the network for example within an installation space or a larger unit or device, it is optionally possible to monitor the temperature of several devices using a temperature sensor.

In a further refinement of the method according to the invention, it is provided for the master counter state, corresponding to the prescribed signal feature, in order to improve the resolution or measurement resolution, to be determined by way of an interpolating measurement method, in particular a time-to-digital conversion method and/or a time-to-digital converter. A linear filter may be used for this purpose, for example. The filter in this case preferably has a long impulse response in relation to a clock frequency that is used. A peak value may for example be held by way of a peak value holding circuit, then converted using an analog-to-digital converter and finally evaluated. By way of example, use may be made here of a linear integrator whose integration result is acquired and accordingly converted into a digital value. Using such a method, a resolution is particularly advantageously able to be improved without considerable extra expenditure having to be provided, as would be connected with an alternatively possible increase in the clock frequency of the master device and/or of the client device and of the respective counters. A corresponding interpolating measurement method may for example advantageously also be used or applied when measuring relative frequency deviations, so as not to have to select the respective clock frequencies of the corresponding devices to be unnecessarily high.

In a further refinement of the method according to the invention, it is provided for the master device to comprise a selection logic unit, by way of which the signal feature is selected and/or prescribed automatically, in particular depending on a line code used in the network and/or a type of modulation used in the network. When using several signal features, several or all of the signal features may also be selected and/or prescribed automatically. As an alternative, it is also possible for the selection logic unit to be designed as a separate device or as a separate apparatus, and the signal features may likewise also be prescribed by hand or manually, for example by the manufacturer or by a user or operator. Advantageously, automatically selecting and/or prescribing the signal feature or the signal features allows the method to be applied flexibly in different situations and/or networks without additional expenditure. By virtue of the automatic selection and prescription, the signal features that are used are thus automatically adjusted, for example to the respective line code and/or the respective type of modulation or the like.

A prescribed signal feature may be for example a particular rising or falling signal edge that may be defined, referenced or identified for example by a particular prescribed height, incline, feature sequence and/or for instance by a particular prescribed time interval from a beginning of the signal. Instead of a signal edge, an amplitude transition in NRZ (non-return to zero) line coding or a phase transition in pulse amplitude modulation (PAM) may also be provided, for example.

In any case, it is of course provided for an assignment between respective counter states, signal features and/or signals to be performed or to take place automatically or in an automated manner, such that uniqueness is ensured for example in the case of several consecutive signals and/or multiple consecutive applications of the method according to the invention in the same network at all times, in particular upon the respective evaluations.

The method according to the invention may be applied in different networks, network cards, network types or network architectures that are also able to implement or use different protocols and that are also able to be used in different fields of application. By way of example, an application in a building network is possible, as is an application in a vehicle network. In particular in the latter case, the devices of the network may be for example controllers of the vehicle, which are connected to one another or interlinked via a bus, for example a CAN bus.

BRIEF DESCRIPTION OF THE SEVERAL VIEWS OF THE DRAWING

An exemplary embodiment of the invention is described below. To this end, in the figures.

DESCRIPTION OF THE INVENTION

The exemplary embodiment explained below is a preferred embodiment of the invention. In the exemplary embodiment, the described components of the embodiment each constitute individual features of the invention which should be considered independently of one another and which in each case also develop the invention independently of one another and should therefore also be regarded as a constituent part the invention individually or in a different combination to that shown. Furthermore, the embodiment described may also be supplemented by further features of the invention from among those that have already been described.

In the figures, functionally identical elements are provided with the same reference signs in each case.

Figure 1:
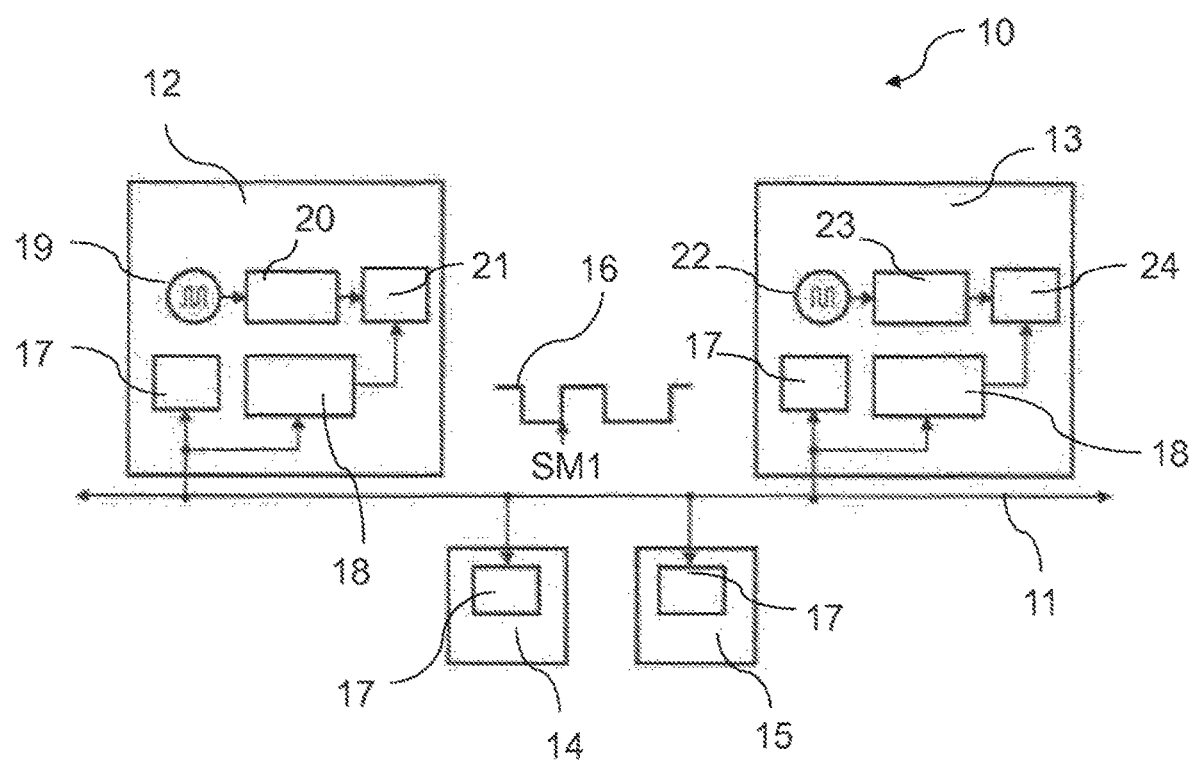
FIG. 1 shows a schematic illustration of a network having a master device, a client device and two further devices.

FIG. 1 shows a schematic illustration of a first network 10 that consists of a bus 11, a master device 12, a client device 13, a first device 14 and a second device 15. The bus 11 serves as signal transmission path, via which signals, data, information and/or messages are able to be exchanged between the devices 12 to 15. The bus 11 may be for example a conventional electrical line or connection suitable for data transmission. The devices 12 to 15 are connected to the bus 11 via corresponding connections and/or connection lines. A signal 16 is also schematically illustrated and is formed in this case for example from a sequence of falling and rising edges, which are connected to one another by constant sections each having one of two different constant signal or voltage levels. In the present case, a rising edge is specifically characterized as a first signal feature SM1. This first signal feature SM1 and the use or significance thereof is described in more detail further below.

The first network 10 may be for example part of a motor vehicle, the devices 12 to 15 then possibly being for example controllers and the bus 11 possibly being a CAN bus. However, this is just one example or case of application, and the first network 10 could also have another structure or architecture and a multiplicity of further devices, and, rather than a CAN bus, FlexRay, Ethernet or a MOST bus or the like could also be used, for example.

In the present case, all of the devices 12 to 15 of the first network 10 are equipped with an interface 17, via which a signal or data exchange is performed over the bus 11. The master device 12 and the client device 13 additionally each have a selection logic unit 18, which is wired such that it receives signals arriving at the respective device 12 or 13. The selection logic unit 18 is configured so as to recognize at least one signal feature SM1, preferably several, for example including different, signal features SM1, SM2 (cf. FIG. 2). The selection logic unit 18 also comprises a trigger apparatus, by way of which, upon such recognition of a particular signal feature SM1, a further action may be executed or prompted. The selection logic unit 18 is furthermore configured so as to automatically select a particular signal feature SM1, which may be performed for example using or based on a line code used in the first network 10, a type of modulation used in the first network 10 or the like. In the present case, the selection logic unit 18 is configured so as to recognize the first signal feature SM1 and/or to respond to the first signal feature SM1. It may also be provided here for the signal feature SM1 to which the selection logic unit 18 should respond to already be prescribed. It may be provided for a signal feature SM1 to be selected automatically by the selection logic unit 18, for example upon a change of the line code that is used, of the type of modulation that is used or the like.

The master device 12 in the present case has a master clock generator 19, which runs or is operated at a regular and constant local master frequency $f_{CLM}$ or prescribes this master frequency $f_{CLM}$, which may be independent of a network clock frequency used on the bus 11. A master counter 20, which is likewise part of the master device 12, is connected to the master clock generator 19. A master counter state be read from the master counter 20 and stored, buffer-stored or filed in a master register 21 of the master device 12. In this case, the individual components or constituents of the master device 12 are wired such that this reading and storage of the master counter state by the selection logic unit 18, in particular by the trigger apparatus comprised thereby, is prompted or is able to be prompted when for example the first signal feature SM1 is acquired or recognized by the selection logic unit 18 at or on or in a signal 16 reaching the master device 12 via the bus 11. The master device 12 may also comprise further components, constituents and/or circuits, not shown here, including in particular an evaluation apparatus that may also have access to the master register 21 and possibly further registers or memories. Counter states read from a counter and stored in a register may also be referred to as captured values.

The client device 13 comprises a client clock generator 22, which is operated at a local client frequency $f_{CLC}$ or prescribes this client frequency $f_{CLC}$, which may be independent both of the network clock frequency used on the bus 11 and of the master frequency $F_{CLM}$. In the same way as the structure of the master device, the client device 13 furthermore has a client counter 23 connected to the client clock generator 22, from or out of which a client counter state is able to be read and stored, buffer-stored or filed in a client register 24.

Therefore, both the master device 12 and the client device 13 thus have particular and specific equipment features. The first device 14 and the second device 15 by contrast need to have only a basic or fundamental configuration of components and capabilities, as may be found in any normal network-capable device.

The arrangement schematically illustrated in FIG. 1 makes it possible to monitor the first network 10 for anomalies, for which purpose, in the present case, a network-specific parameter is used, which may in this case in particular be a propagation time pattern of the signal 16 on the bus 11 in the first network 10. The method for detecting anomalies is described in more detail below with reference to FIG. 3, referring back to the components and arrangements described here in connection with FIG. 1.

Figure 2:
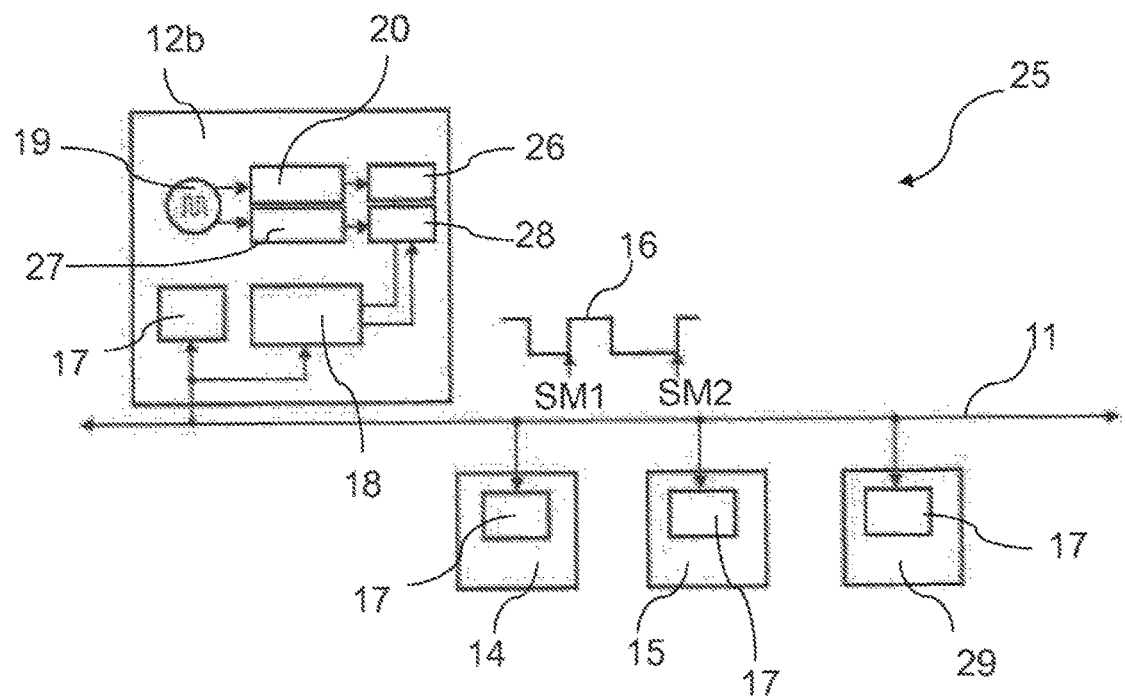
FIG. 2 shows a schematic illustration of another network having a master device and three further devices.

FIG. 2 shows a schematic illustration of a second network 25, which likewise comprises a bus 11, to which in this case however an alternatively designed master device 12b and, instead of the client device 13, a third device 29 are connected. The devices 14 and 15 likewise provided here may correspond to those from FIG. 1. The third device 29 may also be designed in this way, and thus likewise does not have to have any particular features or apparatuses that go beyond a basic or fundamental configuration. Further devices, not illustrated here, may additionally also be incorporated into the second network 25.

The master device 12b essentially comprises the same components as the master device 12, in this case, however, in addition to the master counter 20, a second master counter 27 being connected to the master clock generator 19. In addition, the counter state of the master counter 20 is in this case read into a second master register 26 and a second master counter state of the second master counter 27 is read into or stored in a third master register 28. Reading of the respective counter states of the master counter 20 and of the second master counter 27 may likewise be prompted here by the selection logic unit 18 of the master device 12b. The signal 16 is additionally also schematically illustrated here, a second signal feature SM2 however being identified in addition to the first signal feature SM1. It is provided here, when the signal 16 is sent to the master device 12b via the bus 11 and received by said master device, when the first signal feature SM1 is acquired by the selection logic unit 18, for the master counter state of the master counter 20 to be read into the second master register 26. In the same way, when the second signal feature SM2 is acquired by the selection logic unit 18, the second master counter state of the second master counter 27 is read into the third master register 28, that is to say read from the second master counter 27 and stored in the third master register 28.

By way of this arrangement and wiring described in connection with FIG. 2, is likewise possible to monitor the second network 25 for anomalies. In this case, only the master device 12b is equipped with features or apparatuses that go beyond a basic configuration. Against this background, it is provided here, in an arrangement according to FIG. 2, for the anomaly monitoring or anomaly detection to be performed on the basis of an evaluation of a frequency pattern. This procedure as well will be explained in more detail further below with reference to FIG. 3.

It is however already pointed out at this juncture that the use, illustrated here, of two master counters 20, 27 in the master device 12b constitutes just one variant embodiment. As an alternative, it is also possible likewise for example to connect the third master register 28 to the master counter 20, such that the counter state of the master counter 20 that is then present at this time is used as second master counter state, which is read into this third master register 28 upon detection of the second signal feature SM2. The requirement in this case is however that the master counter 20 is free-running and the reading and storage of the respective master counter states does not have or exert any influence, in particular any time delay, on the master counter 20 or the respective master counter state.

Figure 3:
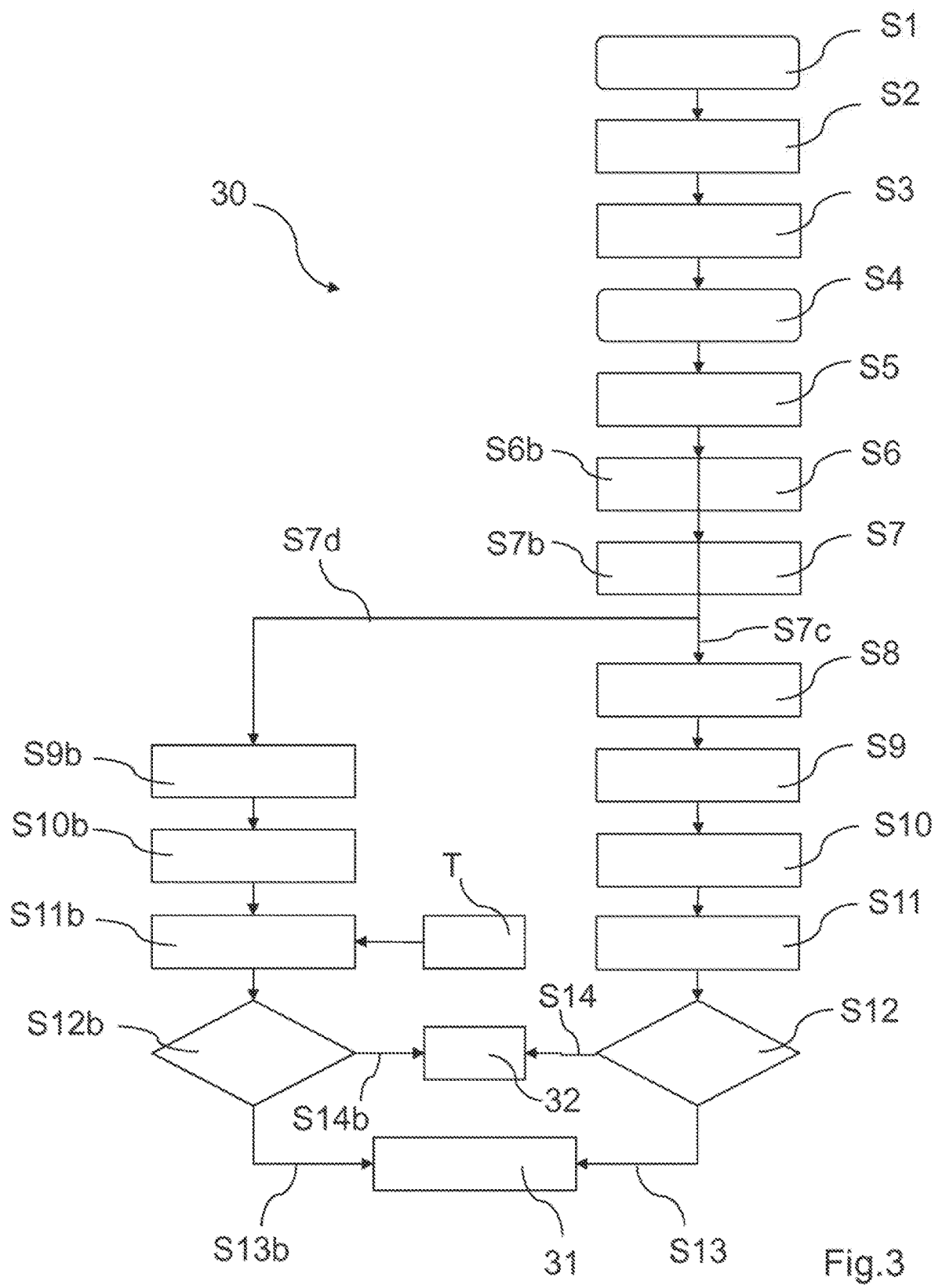
FIG. 3 shows a schematic flowchart of an embodiment of the method according to the invention.

FIG. 3 shows a schematic flowchart 30 on the basis of which a method for detecting anomalies in the first network 10 is intended to be described below. In this case, both of the methods described in connection with FIG. 1 and FIG. 2 or with the first network 10 and the second network 25 are combined. That is to say, both a propagation time pattern and a frequency pattern are evaluated in order to achieve improved overall accuracy, reliability and safety in the anomaly detection and in the anomaly monitoring.

At a start S1 of the method, it is assumed that the first network 10 is designed and configured completely on a hardware plane. The clock generators 19, 22 are in particular also already active and the counters 20, 23 may already be running or operating.

In a method step S2, respective setpoint values of the network-specific parameters used further on are initially determined under predetermined or controlled conditions, that is to say for example under supervision, immediately after the construction or the configuration of the first network 10. To this end, the signal 16 may be sent for example from all of the other devices 13, 14, 15 to the master device 12 and additionally from the first device 14 and the second device 15 to the client device 13. Furthermore, a further signal may additionally also be sent from the client device 13 to the master device 12. In this operating phase, further signals may also be sent and/or the signal 16 may be sent multiple times, such that a sufficient database for determining the setpoint values is available. To determine the setpoint values, the method described below may be fully or partly run through, values determined in the process being able to be considered and used as setpoint values.

At this time, it is assumed that no anomaly is present, such that the signals transmitted thereby under known, monitored conditions and their properties and for example respectively associated counter states may be assumed to be and used as anomaly-free setpoint or normal values and stored in the evaluation apparatus as comparison values in a method step S3.

As soon as respective setpoint values of the network-specific parameters for all of the devices 12 to 15 of the first network 10 and/or all of the device pairs are determined and stored, the network-specific parameters or their setpoint values are thus trained or, in other words, the evaluation apparatus is trained with the parameters or setpoint values. A setpoint state of the first network 10 without anomalies is thus therefore known.

After this training phase has ended, regular operation or normal operation of the first network 10 is then assumed in a method step S4. In this normal operation, no further additional external monitoring measures and no supervision is necessary, since any anomalies that occur are able to be recognized automatically by the further method steps.

For the present example, it is assumed that, in a method step S5, the first device 14 transmits the signal 16 via the bus to all of the devices connected to the bus 11, and therefore in particular both to the master device 12 and to the client device 13. In this case, a message X is transmitted using the signal 16, the terms "signal" and "message" also being used interchangeably below.

In method steps S6 and S6b, the first signal feature SM1 of the signal 16 is selected and prescribed by the selection logic units 18 of the client device 13 and of the master device 12. The second signal feature SM2 is additionally selected and prescribed by the master device 12. The signal features SM1, SM2 may also however have already taken place or have been provided at an earlier time, in particular prior to the transmission of the signal 16.

In a following method step S7, prompted by the trigger apparatus of the client device 13, upon the acquisition or recognition of the first signal feature SM1—or its arrival at the client device 13—the client counter state $C_{XC}$ corresponding to this arrival, that is to say to an arrival time of the first signal feature SM1 of the message X, of the client counter 23 is read and stored in the client register 24. In parallel, as soon as the signal 16, more precisely the first signal feature SM1, has reached the master device 12, in a method step S7b—prompted by the trigger apparatus of the master device 12—the first master counter state $C_{XM}$ of the master counter 20 is read and stored in the first master register 21. This first master counter state $C_{XM}$ thus corresponds to an arrival time of the first signal feature SM1 at the master device 12. The first master counter state $C_{XM}$ may also be stored in parallel or subsequently in the second master register 26 as $C_{XM1}$. As an alternative, it may also be ensured that the value $C_{XM}$ is also available at a later time in the first master register 21 for the frequency pattern evaluation described further below.

At this point, the method follows two paths S7c and S7d in parallel, which will be described one after another below. The path S7c in this case corresponds to the use or evaluation of a propagation time pattern, whereas the journey S7d corresponds to the assessment or evaluation of a frequency pattern.

Following the path S7c, in a subsequent step S8, after the signal 16 has run completely through the bus 11, the client device S13 transmits the client counter state $C_{XC}$ in a separate signal or a separate message to the master device 12 via the bus 11. The received client counter state $C_{XC}$ of the evaluation apparatus is forwarded or made available by or in the master device 12.

In a method step S9, the client device 13 sends a reference message R or a corresponding reference signal to the master device 12 via the bus 11. The reference message R contains a reference client counter state $C_{RC}$, which corresponds to a signal feature of the reference message R, as information. In other words, the reference client counter state $C_{RC}$ may for example have been read in a fixed, prescribed or known time interval at a time at which the signal feature of the reference message R was generated and/or transmitted by the client device 13.

In a method step S10, the reference message R is received by the master device 12 and the signal feature of the reference message R is recognized or acquired. Furthermore, prompted by the trigger apparatus of the master device 12, the reference master counter state $C_{RM}$ corresponding to this recognition or acquisition of the signal feature of the reference message R is read from the master counter 20. The client reference counter state $C_{RC}$ transmitted with the reference message R to the master device 12 and the master reference counter state $C_{RM}$ are likewise transmitted by or made available to the evaluation apparatus.

A propagation time of the signal 16 from the first device 14 to the master device 12 and to the client device 13 and a propagation time of the reference message R from the client device 13 to the master device 12 is given by physical boundary conditions, in particular a line length and a propagation constant for electromagnetic waves on electrical lines—specifically on the bus—and in connection with the specific spatial arrangement of the devices 12 to 15 and of the bus 11 thus characteristic for a particular network, here for the first network 10. The propagation constant may be for example 5 ns per meter. A pure propagation time or signal propagation time of the signal 16 on the bus 11 with a line length of 5 m is thus approximately 25 ns. Delay times or latencies may also additionally result due to respective reception electronics. These delay times may lie within the same order of magnitude and likewise be 25 ns, for example. It thus follows that different propagation times arise for the signal 16 depending on whether it was sent by the first device 14 as prescribed and expected or whether it was actually sent by another device, for example by a second device 15 or an external device. A propagation time difference $$\Delta T_X = T_{QM} - T_{QC} \qquad (1)$$

is thus always the same or constant for each message X or each other signal that was actually transmitted by one and the same signal source Q, for example here by the first device 14. $T_{QM}$ in this case indicates the propagation time from the signal source Q to the master device 12 and $T_{QC}$ indicates the propagation time from the signal source Q to the client device 13. The propagation time difference $\Delta T_X$ may be determined for each individual message and for each individual signal that is sent in the first network 10.

The propagation time difference $\Delta T_X$ is specific to the devices due to the fixed spatial positions and relationships in the first network 10. It may thus serve as a type of authentication of the respective signal source Q and, in a security-critical situation—for example upon an attack or a manipulation of the first network 10—an external device would for example send a message Y that purportedly originates from the first device 14. When using a CAN bus 11, the external device could for example use a CAN identifier that is assigned, as intended, solely to the first device 14. In a conventional network, this improper use of the CAN identifier might not be recognized. Such a situation may also arise if a device, here for example the second device 15, had been manipulated. In principle, this security-critical abnormal situation is able to be recognized in the present case in that the propagation time difference $\Delta T_Y$ of the falsified or manipulated message Y sent by the external device is given by:

$$\Delta T_Y = T_{YM} - T_{YC} \quad (2)$$

Due to the different spatial positions and therefore the different propagation times for messages or signals transmitted by the first device 14 and by the external device, a deviation of the actual propagation time difference $\Delta T_Y$ from an expected propagation time difference is able to be recognized and fudged or recognized as an anomaly in the first network 10.

In principle, the respective propagation time differences $\Delta T_X$, $\Delta T_Y$ have to be measured or determined in this case with sufficiently good resolution. In the example described here, this resolution must be roughly a few nanoseconds.

Using the selection logic units 18, a particular signal edge of the signal 16 or of the message X or of the message Y, for example a first edge following a starting edge, may be established or determined as first signal feature SM1, for example. The counter states $C_{XM}$ and $C_{XC}$, acquired in method steps S7, S7b, of the counters 20, 23 operated or supplied at the frequency $f_{CLM}$, respectively $f_{CLC}$, may then for example be acquired or captured when this set edge, that is thus to say the first signal feature SM1, arrives or is present at an output of the respective selection logic unit 18. The respective arrival time of the first signal feature SM1 at the master device 12 is thus determined in relation to the local clock of the master clock generator 19 and the time of arrival of the first signal feature SM1 at the client device 13 is determined in relation to the local clock of the client clock generator 23.

These respective arrival times of the first signal feature SM1 at the master device 12 or at the client device 13 may be referred to as $t_{XM}$, respectively as $t_{XC}$, and be expressed by integer multiples of the respective counter states $C_X$, respectively $C_{XC}$:

$$t_{XM} = C_{XM}/f_{CLM} \text{ and } t_{XC} = (C_{XC}/f_{CLC}) + t_{off} \quad (3)$$

In this case, a time reference t=0 for a master counter state of zero may be set. The client device 13 then however has to proceed from an initially unknown time offset $t_{off}$. From a combination of the propagation time difference $\Delta T_X$ for the message X and the arrival times $t_{XM}$ and $t_{XC}$, it is possible to obtain the relationship $$\Delta T_X = t_{XM} - t_{XC} = (C_{XM}/f_{CLM}) - (C_{XC}/f_{CLC}) - t_{off} \quad (4)$$

The local clock frequency $f_{CLC}$ of the client clock generator 22 may be expressed by a relative frequency deviation $\Delta f_{rel}$ from the local clock frequency $f_{CLM}$ of the master clock generator 19:

$$f_{CLC} = f_{CLM}(1+\Delta f_{rel}) \approx f_{CLC}$$

In practice, the relative frequency deviation $\Delta f_{rel}$ may be small, and may be for example $\Delta f_{rel} \approx 10^{-5}$ when using quartz oscillators or oscillating quartz crystals. The time difference (4) to the time offset $t_{off}$ is therefore able to be determined from the master counter state $C_X$ and the client counter state $C_{XC}$.

From the client reference counter state $C_{RC}$ transmitted with the reference message R, a time difference $$\Delta T_R = t_{RM} - t_{RC} = (C_{RM}/f_{CLC}) - (C_{RC}/f_{CLC}) - t_{off} \quad (5)$$

may be determined as reference. This time difference (5) likewise contains the time offset $t_{off}$, but with a known propagation time difference that depends on the physical distance between the client device 13 and the master device 12. This distance is known for the first network 10.

Using the data that are now known, a propagation time pattern Pat (X) for the message X is able to be calculated in a following method step S11. In the present case, a difference between the relationship (4) and the time difference (5) is formed for this purpose, as a result of which the unknown time offset $t_{off}$ is able to be eliminated from the calculation. This thus gives the propagation time pattern $$\text{Pat}(X) = f_{CLC} \cdot (\Delta T_X - \Delta T_R) = (C_{XM} - X_{XC}) - (C_{RM} - C_{RC}) = (C_{XM} - C_{RM}) - (C_{XC} - C_{RC}) \quad (6)$$

The propagation time pattern Pat (X) thus calculated for the message X may then be compared, in a method step S12, with the expected setpoint value or setpoint propagation time pattern determined in method step S2. In this case, a threshold value for a deviation between the propagation time pattern Pat(X) of the message X and the propagation time pattern stored as setpoint value may be prescribed. An anomaly in the first network 10 is recognized in this case when this deviation reaches or exceeds the prescribed threshold value.

The threshold value may be obtained or determined for example by determining a plausible value for the propagation time pattern Pat (X) using manufacturer hardware specifications of the devices used for the first network 10 and increasing this plausible value by 10%. Since the deviation is able to take place both upwardly and downwardly, it is provided in the present case for a magnitude of the difference between the propagation time pattern Pat (X) and the corresponding setpoint value to be formed, and for this magnitude to be compared with the threshold value.

If no anomaly is detected, this means that the magnitude of the deviation is smaller than the threshold value, and normal operation 31 of the first network 10 is thus assumed or continued in a method step S13. This normal operation 31 is distinguished through the continued intended functioning and execution of functions in the first network 10 and all of the connected or participating devices 12 to 15.

If however an anomaly is detected as the magnitude of the deviation is greater than the threshold value, then there is transition to anomaly operation 32 in a method step S14. The presence of an anomaly may be indicated for example in the anomaly operation 32. This may be performed for example acoustically, optically and/or electronically or electrically, for example by outputting a corresponding alarm signal from the evaluation apparatus that detected the anomaly. It is also possible to provide, when the anomaly is detected, for the signal or data transmission in the first network 10 to be fully or partly interrupted.

To achieve a sufficient resolution when determining the respective propagation time patterns, a minimum propagation time or a minimum distance between two devices 12 to 15 in the first network 10 should lead to a propagation time pattern that is reliably able to be distinguished using the respective components and circuits that are used, in particular using the evaluation device that is respectively used. By way of example, a minimum distance between two devices 12 to 15 of 50 cm may be provided in the local first network 10, which corresponds to a propagation time or signal propagation time of around 2.5 ns and, at a used local clock frequency $f_{CLM}$, respectively $f_{CLC}$, of the master clock generator 19, respectively of the client clock generator 22, of 400 MHz, precisely a distance of 50 cm is thus able to be resolved.

To improve this resolution, the local clock frequencies $f_{CLM}$, $f_{CLC}$ of the clock generators 19, 22 may be increased.

One alternative, which is generally connected with less expenditure, may consist in using an interpolating measurement method. To this end, a linear integrator may in each case be provided for example in the client device 13 and in the master device 12, the integration result of which linear integrator is converted using an analog-to-digital converter that is also provided there. In general, a known time-to-digital conversion method may be resorted to here. Using such a procedure, the achievable resolution may lie for example at up to a factor of 1000 below a period duration of the local clock frequencies $f_{CLM}$ and $f_{CLC}$. At a local clock frequency $f_{CLM}$, $f_{CLC}$ of the clock generators 19, 22, it is thus possible to achieve a resolution of 0.2 ns, which corresponds to a resolvable distance for two devices 12 to 15 of 4 cm.

At this point, it is now intended to introduce the second method branch, carried out in parallel and following method step S7d. After the first master counter state $C_X$ corresponding to the first signal feature SM1 has already been acquired in method step S7b and also been stored in the form of the master counter state $C_{XM1}$, when the second signal feature SM2 of the signal 16 arrives at the master device 12, in a method step S9b, a master counter state $C_{XM2}$ corresponding to this arrival of the second signal feature SM2 is then acquired and stored for example in the third master register 28.

A time interval between the two signal features SM1 and SM2 or between their respective arrivals or between the arrival times of the signal features SM1 and SM2 at the master device 12 may be determined in relation to the local master clock frequency $F_{CLM}$. The arrival time $t_{XM}$ of the first signal feature SM1 at the master device 12 is also referred to below as $t_{XM1}$. $t_{XM1}$ and the time $t_{XM2}$ of the arrival of the second signal feature SM2 are therefore given as:

$$t_{XM1}=C_{XM1}/f_{CLM} \text{ and } t_{XM2}=C_{XM2}/f_{CLM} \qquad (8)$$

The time interval between the signal features SM1 and SM2, that is to say the time difference $$\Delta T_{XMM}=t_{XM1}-t_{XM2}=(C_{XM2}/f_{CLM})-(C_{XM1}/f_{CLM})=\Delta C_{XMM}/f_{CLM} \qquad (9)$$

is a fixed variable for the message X, and the absolute time interval between the signal features SM1 and SM2 is thus independent of the local clock frequency $f_{CLM}$ or of a corresponding local clock frequency of the sending device, that is to say here of the first device 14, that transmitted the message X. $\Delta C_{XMM}$ denotes a difference between the counter states $C_{XM2}$ and $C_{XM1}$ and corresponds to a number of counter cycles that the master counter 20 has acquired or counted between the arrival of the first signal feature SM1 and the arrival of the second signal feature SM2.

A number $\Delta C_X$ of cycles is calculated or determined in the master device 12 and/or by the evaluation apparatus in a subsequent method step S10b, these having been used by the first device 14 to send the message X. This number $\Delta C_X$ may be determined on the basis of the type of modulation used in the first network 10 or on the bus 11, a corresponding protocol, a bus system that is used and/or a similar variable that is fixedly prescribed and known in the first network 10. By way of example, the bus 11 may be operated as a CAN bus with a nominal or specified data rate of 500 000 bit/s, such that a cycle is intended to be 2 μs long. The number $\Delta C_X$ may be determined from the difference between the two times $t_{XM1}$ and $t_{XM2}$ or from the master counter states corresponding to these times $t_{XM1}$ and $t_{XM2}$, the nominal cycle length, for example 2 μs here, also being able to be taken into account. This procedure is however explicitly not restricted to the CAN bus, but may be used in the same way on other bus systems.

$\Delta C_X$ may for example be an integer and thus indicate the number of entire or complete cycles that are awaited or used by the signal source, that is to say the device sending the message X, between the two signal features SM1 and SM2. It may also be possible, in a correspondingly variable or flexible network and/or transmission protocol, to determine $\Delta C_X$ by taking into account a cycle length actually used by the source device instead of the nominal or specified cycle length. This may be determined in relation to the master clock frequency $f_{CLM}$. This actually used cycle length may be determined in the master device 12, for example by corresponding monitoring and evaluation of the arriving signal 16. In this case, for example, another known variable, such as for instance a data rate relating to the cycle, that is to say an amount of data per cycle, may also be taken into account, this possibly being independent of the actual cycle length.

For the time difference $\Delta T_{XQ}$ in relation to the actual signal source Q of the message X, the following results:

$$\Delta T_{XQ}=t_{XQ2}-t_{XQ1}=\Delta C_X/f_{CLQ}=\Delta T_{XMM}=\Delta C_{XMM}/f_{CLM} \qquad (10)$$

In this, $f_{CLQ}$ is the local clock frequency of the actual signal source Q of the message X.

A ratio of the number $\Delta C_X$ of cycles used between the signal features SM1 and SM2 by the signal source Q—that is to say here purportedly of the first device 14—to the number $\Delta C_{XMM}$ of cycles of the master clock generator 19 counted by the master device 12 between the signal features SM1 and SM2 therefore depends on a relative clock frequency deviation $\Delta f_{QMrel}$ between the master device 12 and the signal source Q:

$$\Delta C_X/\Delta C_{XMM}=f_{CLQ}/f_{CLM}=f_{CLM}\cdot(1+\Delta f_{QMrel})/f_{CLM}=1+\Delta f_{QMrel} \qquad (10)$$

This relative clock frequency deviation $$\Delta f_{QMrel}=(\Delta C_X/\Delta C_{XMM})-1 \qquad (11)$$

constitutes a characteristic variable for a particular configuration, that is to say for a particular combination between specific devices, and is therefore able to serve or to be used to identify the signal source of the message X to the master device 12.

The relative clock frequency deviation $\Delta f_{QMrel}$ is calculated as a frequency pattern FPat(X) for the message X in a method step S11b. Since clock frequencies prescribed by clock generators may generally be temperature-dependent, that is to say may change as a temperature of the respective clock generator changes, respective temperature data T are taken into account in the calculation of the frequency pattern FPat(X). In the present case, the temperatures of the master clock generator 19 and a temperature of the first device 14 from which the message X purportedly originates would thus in this case be incorporated into the calculation and/or be taken into account in a further evaluation.

This further evaluation includes a threshold value comparison, performed in a method step S12b, of a magnitude of a difference between the frequency pattern FPat(X) and the corresponding setpoint value determined in method step S2 for the signal source of the message X. Since here for example the message X, according to CAN identifier, originates from the first device 14, the setpoint frequency pattern would thus be used for a message sent from the first device 14 to the master device 12. This threshold value comparison may be performed in the same way as for method step S12. By way of example, a frequency deviation, specified in a corresponding data sheet, of an oscillating quartz crystal of the respective clock generator may be +/−40 Hz, and in this case the threshold value would thus be set at a frequency deviation of 44 Hz, corresponding to the plausible frequency deviation plus 10%.

In this case too, the local clock frequency $f_{CLM}$ must of course be high enough in order also to be able to measure relatively small frequency deviations, for example within the order of magnitude $10^{-5}$ over a relatively short time of for example $\Delta T_{XX} \approx 10^{-4}$ s. The alternative advantageously arises here of using an interpolating time-to-digital conversion method in order thus to keep the necessary magnitude or size of the clock frequency $f_{CLM}$ as low as possible and to be able to achieve this with as little expenditure as possible.

If no anomaly is detected in the threshold value comparison in method step S12b, since the difference or deviation of the frequency pattern FPat (X) determined for the message X from the corresponding threshold value is smaller than the threshold value, then in this case too there is transition into normal operation 31 or normal operation 31 is continued in a method step S13b.

If by contrast an anomaly is recognized in method step S12b, then in this case too there is a change to anomaly operation 32 in a method step S14b.

In normal operation 31, monitoring of the first network 10 using the method described here may be performed continuously, that is to say for each message sent in the first network 10. It is also possible to perform the described anomaly checks only for particular messages or signals, which may be for example selected or defined randomly or according to a predetermined criterion.

Overall, the example shows how propagation time and frequency difference monitoring in a network in order to detect anomalies is able to be provided by the invention.

LIST OF REFERENCE SIGNS 10 first network
11 bus
12, 12b master device
13 client device
14 first device
15 second device
16 signal
17 interface
18 selection logic unit
19 master clock generator
20 master counter
21 master register
22 client clock generator
23 client, counter
24 client register
25 second network
26 second master register
27 second master counter
28 third master register
29 third device
30 flowchart
31 normal operation
32 anomaly operation
S1 start
S2 to S14 method steps S6b to S14b method steps
S7c, S7d paths
SM1 first signal feature
SM2 second signal feature
T temperature data

The invention claimed is:

1. A method for monitoring a network for anomalies, the network provided for data transmission and having a plurality of devices connected to one another overfixedly prescribed signal transmission paths, which comprises the steps of:
    assigning one of the devices to be a master device having a counter and a trigger apparatus, and by said master device a prescribed signal feature of a signal transmitted via the network is acquired;
    reading, upon acquisition of the prescribed signal feature, a master counter state of the counter of the master device, corresponding to a time of the acquisition;
    determining via an evaluation apparatus, under predetermined anomaly-free conditions, a setpoint value of at least one network-specific parameter defined by a physical property of the network, wherein a frequency difference between a frequency of a clock generator of an actual source device, from which the signal was transmitted, and a clock generator of the master device, coupled to the counter of the master device, forms the network-specific parameter;
    determining a respective actual value of the at least one network-specific parameter by the evaluation apparatus from a difference between a read master counter state and a further counter state;
    indicating an anomaly if a predetermined deviation criterion between the respective actual value and the setpoint value is met;
    additionally acquiring a second prescribed signal feature of the signal by the trigger apparatus of the master device;
    reading a second master counter state, corresponding to a time of an acquisition of the second prescribed signal feature, wherein the actual value of the frequency difference is determined on a basis of a difference between the master counter state and the second master counter state and taking into account a prescribed data transmission rate and/or network clock frequency used in the network and/or a communication protocol used in the network and/or a type of modulation used in the network;
    calculating a relative frequency deviation as $\Delta f_{rel} = \Delta C_X / \Delta C_{XMM}$, wherein
    $\Delta C_X$ indicates a number of cycles awaited by the actual source device between the transmission of the first and second prescribed signal features; and
    $\Delta C_{XMM}$ indicates the difference between the master counter state and the second master counter state.

2. The method according to claim 1, wherein:
    a propagation time pattern of the signal in the network constitutes the at least one network-specific parameter and it is provided, for determining an actual value;
    one of the devices of the network is a client device that has a counter and a trigger apparatus;
    the signal is transmitted via the network both to the master device and to the client device; and
    the prescribed signal feature to be acquired by the trigger apparatus of the client device and a client counter state, corresponding to a time of an acquisition, of the counter of the client device to be read, wherein an actual value of the propagation time pattern is determined on a basis of the client counter state, which serves as the further counter state.

3. The method according to claim 2, which further comprises:

transmitting a reference signal from the client device to the master device in which a read reference client counter state corresponding to a sending time of a prescribed signal feature of the reference signal is transmitted to the master device;

acquiring the prescribed signal feature of the reference signal by the trigger apparatus of the master device and reading a reference master counter state, corresponding to a time of an acquisition of the prescribed signal feature of the reference signal; and using the reference client counter state and the reference master counter state to determine the actual value of a propagation time pattern.

4. The method according to claim 3, which further comprises calculating the actual value of the propagation time pattern PAT of the signal by:

$$PAT = [C_{XM} - C_{XC}] - [C_{RM} - C_{RC}] = [C_{XM} - C_{RM}] - [C_{XC} - C_{RC}],$$

wherein:

$C_{XM}$ indicates the master counter state corresponding to the prescribed signal feature;

$C_{XC}$ indicates the client counter state corresponding t the prescribed signal feature;

$C_{RM}$ indicates the reference master counter state; and $C_{RC}$ indicates the reference client counter state.

5. The method according to claim 2, which further comprises:

additionally determining the actual value of the propagation time pattern by a client-side part of the evaluation apparatus that is configured so as to perform own calculations; and indicating the anomaly if the deviation criterion between a respective determined actual value and the setpoint value is recognized as being met by the evaluation apparatus and/or by the client-side part of the evaluation apparatus.

6. The method according to claim 1, which further comprises recognizing the anomaly in the network if the actual source device simulates being another purported source device of the network; and wherein in a check as to whether the deviation criterion is met, the evaluation apparatus takes into account a temperature, acquired by way of a respective temperature sensor, of the master device and of the another purported source device.

7. The method according to claim 1, which further comprises determining the master counter state corresponding to the prescribed signal feature, in order to improve a resolution, by way of an interpolating measurement method.

8. The method according to claim 1, wherein the master device has a selection logic unit, by way of which the signal feature is selected and/or prescribed automatically.

9. The method according to claim 1, which further comprises determining the master counter state corresponding to the prescribed signal feature, in order to improve a resolution, by way of an interpolating measurement method performed by a time-to-digital converter.

10. The method according to claim 1, wherein the master device has a selection logic unit, by way of which the signal feature is selected and/or prescribed automatically, depending on a line code used in the network and/or a type of modulation used in the network.

* * * * *